(12) United States Patent  
Locascio et al.

(10) Patent No.: US 7,319,741 B1  
(45) Date of Patent: Jan. 15, 2008

(54) MEDIA RESOURCE CARD WITH DYNAMICALLY ALLOCATED RESOURCE POINTS

(75) Inventors: Timothy Ray Locascio, Osterville, MA (US); James Thomas DellaMorte, Sr., West Barnstable, MA (US); Patricia Langley, Brewster, MA (US); John R. DeCesare, Sandwich, MA (US); Gary Baldino, Milford, CT (US)

(73) Assignee: Excel Switching Corporation, Hyannis, MA (US)

( * ) Notice: Subject to any disclaimer, the term of this patent is extended or adjusted under 35 U.S.C. 154(b) by 294 days.

(21) Appl. No.: 10/693,621

(22) Filed: Oct. 24, 2003

(51) Int. Cl.  
*H04M 1/64* (2006.01)

(52) U.S. Cl. .................. 379/88.07; 455/560; 709/227

(58) Field of Classification Search ............. 379/9.01, 379/88.01, 88.07; 709/217, 227; 713/200; 455/560  
See application file for complete search history.

(56) References Cited

U.S. PATENT DOCUMENTS

| | | | |
|---|---|---|---|
| 6,731,722 B2 * | 5/2004 | Coffey | 379/88.01 |
| 2003/0187993 A1 * | 10/2003 | Ribot | 709/227 |
| 2004/0158618 A1 * | 8/2004 | Shaw | 709/217 |
| 2004/0199787 A1 * | 10/2004 | Hans et al. | 713/200 |
| 2005/0047556 A1 * | 3/2005 | Somerville et al. | 379/9.01 |

* cited by examiner

*Primary Examiner*—Gerald Gauthier  
(74) *Attorney, Agent, or Firm*—Cesari and McKenna, LLP

(57) ABSTRACT

A system and method are disclosed for the licensing and managing media resources in a converged services platform. A novel central pool of resource points representing a licensed level of media resource capability is created, the central pool for the storage of all default and any additional licensed resource points represented by the converged services platform, where portions of the central pool are dynamically allocated to one or more media resource cards.

26 Claims, 4 Drawing Sheets

| NUMBER | FUNCTION | MAX CHANNELS PER DSP STREAM | MAX CHANNELS PER DSP CHIP | # OF RESOURCE POINTS/ CHANNEL |
|---|---|---|---|---|
| TONE RECEPTION | | | | |
| 0x01 | DTMF (μ-law) | 192 | 384 | 5 |
| 0x02 | MFR1 (μ-law) | 256 | 512 | 5 |
| 0x03 | DTMF (A-law) | 192 | 384 | 5 |
| 0x04 | MFR1 (A-law) | 256 | 512 | 5 |
| 0x05 | MFR2 (A-law) | 256 | 512 | 8 |
| 0x06 | MFR2 (μ-law) | 256 | 512 | 8 |
| 0x07 | CPA (A-law) | 192 | 384 | 10 |
| 0x08 | CPA (μ-law) | 192 | 384 | 10 |
| 0x09 | DIAL PULSE | 192 | 384 | 10 |
| 0x0A | ENERGY DETECTION | | | |
| TONE GENERATION | | | | |
| 0x30 | UNIVERSAL GEN. (μ-law) | 256 | 512 | 0 |
| 0x31 | UNIVERSAL GEN. (A-law) | 256 | 512 | 0 |

FIG. 4A

| NUMBER | FUNCTION | MAX CHANNELS PER DSP STREAM | MAX CHANNELS PER DSP CHIP | # OF RESOURCE POINTS/ CHANNEL |
|---|---|---|---|---|
| CONFERENCING (THESE FUNCTIONS REQUIRE 2 STREAMS) | | | | |
| 0x21 | MONITOR | 128 | 256 | 8 |
| 0x22 | UNIFIED | 128 | 256 | 8 |
| 0x23 | DTMF CLAMPED | 128 | 256 | 8 |
| 0x24 | DYNAMIC (μ-law) | 128 | 256 | 8 |
| 0x25 | DYNAMIC w/DTMF CLAMPED (μ-law) | 128 | 256 | 8 |
| 0x26 | DYNAMIC (A-law) | 128 | 256 | 8 |
| 0x27 | DYNAMIC w/DTMF CLAMPED (A-law) | 128 | 256 | 8 |
| FILE PLAYBACK/RECORD (THESE FUNCTIONS REQUIRE 2 STREAMS) | | | | |
| 0x1D | FILE PLAYBACK/RECORD | 64 | 128 | 12 |

FIG. 4B

MEDIA RESOURCE CARD WITH DYNAMICALLY ALLOCATED RESOURCE POINTS

BACKGROUND OF THE INVENTION

1. Field of the Invention

The present inventions relates generally to the field of telecommunications and, more specifically, to a media resource card which may be used, in conjunction with a converged services platform, to provide a wide variety of enhanced communications services.

2. Background Information

A continuing trend of convergence between the circuit-switched public switched telephone network (PSTN) and packet-switched networks, such as Internet Protocol (IP) networks, has created demand for systems capable of interfacing with both types of networks while supporting a large number of diverse applications. Such applications include toll-free calling, wireless/wireline prepaid calling, directory assistance, voicemail, call centers, conferencing and many others. In order to support such diverse applications, it is generally necessary to provide a capability for performing DTMF tone generation/detection, voice recorded announcements and similar communications services. Such basic capability, conventionally packaged as a "card" or printed circuit board which interfaces with an industry standard bus, has been commercially available for some time from a variety of vendors including Intel Corporation and NMS Communications.

However, marketplace demands indicate that greater scalability, density, smaller packaging and greater performance/cost ratios are needed in order for telecommunication carriers and other service providers to operate profitably and to be in position to rapidly deploy new applications which represent new revenue sources. As a result, there is need for greater flexibility and programmability in delivering the communications services which enable the applications.

SUMMARY OF THE INVENTION

In brief summary, the present invention provides a media resource card which, when integrated into a converged services platform, is operable to perform a variety of enhanced telecommunication services. Such services include tone detection/tone generation, conferencing, recording and playback, and numerous others.

Each media resource card is associated with a predetermined number of "resource points." As used herein, resource points represent a license or authorization level. In a preferred embodiment, resource points are maintained in a central system pool and the entire pool is available to any given media resource card. Preferably, in response to instructions from an application program, resource points from the central pool are dynamically allocated to a particular media resource card when needed to perform specific services. Additional resource points may be purchased by a customer and added to the central pool.

BRIEF DESCRIPTION OF THE DRAWINGS

The invention description below refers to the accompanying drawings, of which:

FIGS. 4A and 4B are tables showing exemplary services that may be performed by a media resource card of the type shown in FIGS. 1 and 2 and the number of resource points required for such services.

DETAILED DESCRIPTION OF AN ILLUSTRATIVE EMBODIMENT

Figure 1:
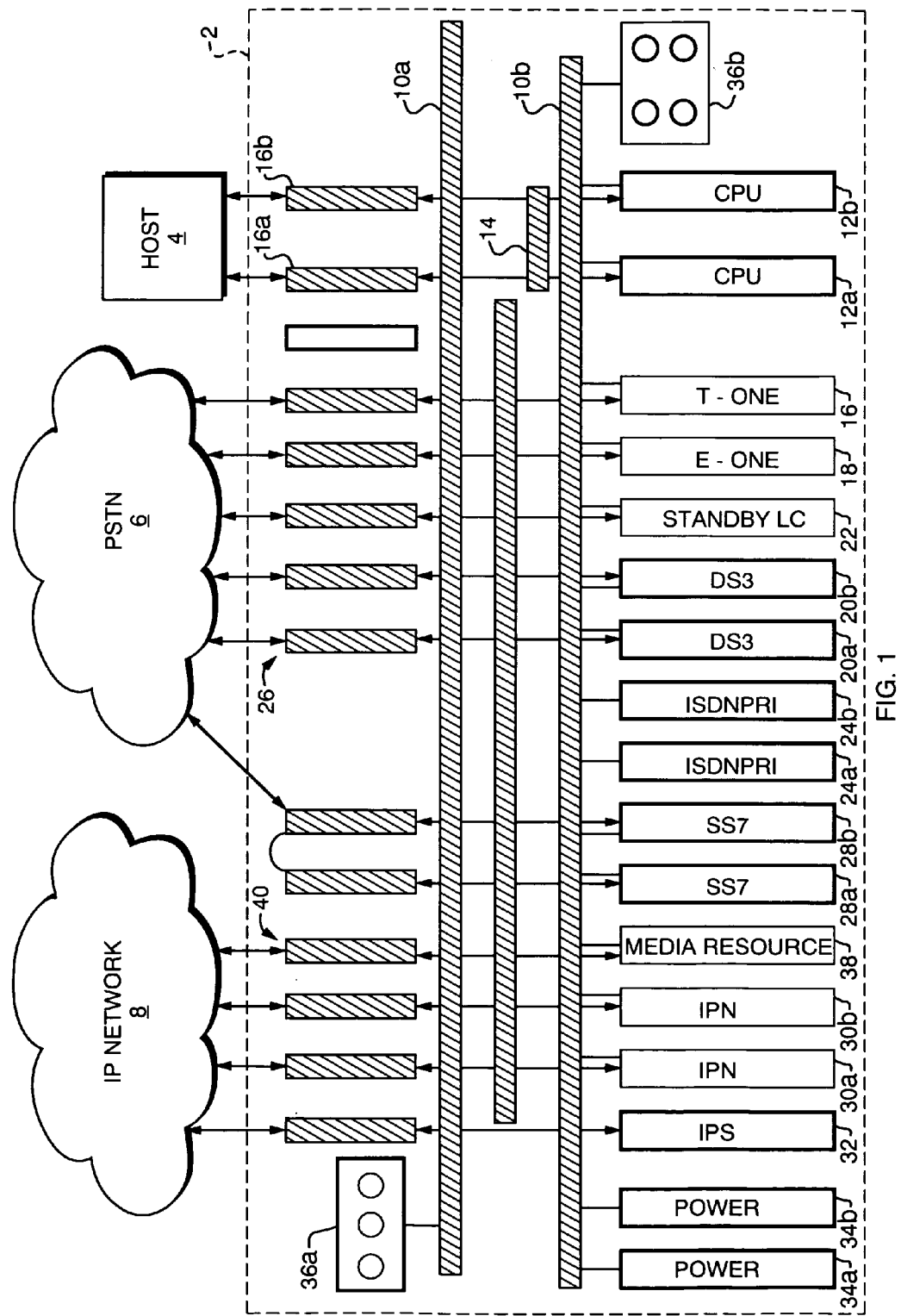
FIG. 1 is a block diagram of a converged services platform which includes a media resource card constructed in accordance with a preferred embodiment of the present invention.

FIG. 1 shows a converged services platform 2 which is controlled by an application program (not shown) running on a host computer 4. Hardware and software which may be used to implement a converged services platform of the type shown are available from Excel Switching Corporation of Hyannis, Mass. With the inclusion of appropriate cards discussed below, platform 2 is capable of interfacing with both the PSTN 6 and an IP network 8.

As shown, platform 2 includes redundant switching buses 10a and 10b. Redundant main CPU cards 12a, 12b are connected to buses 10a, 10b, an HDLC bus 14, and to host 4 by way of input/output (I/O) cards 16a, 16b. Depending upon the requirements of a particular application, various combinations of the following "line" cards, each of which supports a particular digital telecommunications protocol, may be included within platform 2: T1 card 16; E1 card 18, DS3 cards 20a, 20b. For redundancy, a standby card 22, which is a duplicate of one of the other line cards, may also be included. All such line cards have an associated I/O card, denoted collectively by reference number 26, which serves as an interface to PSTN 6.

If a particular application requires ISDN signaling, ISDN PRI cards 24a, 24b may be included within platform 2. Similarly, if a particular application requires SS7 signaling, SS7 cards 28a, 28b may be included. If a particular application requires IP media transport, platform 2 may include IPN cards 30a, 30b or an IPS card 32. Also, if a particular application requires media services, a media resource card 38 (or multiple cards 38 for redundancy or greater resource capacity or both) may be included. Cards 30, 32 and 38 each have an associated I/O card, denoted collectively by reference number 40. Power cards 34a, 34b and cooling fans 36a, 36b are also present within platform 2.

Figure 2:
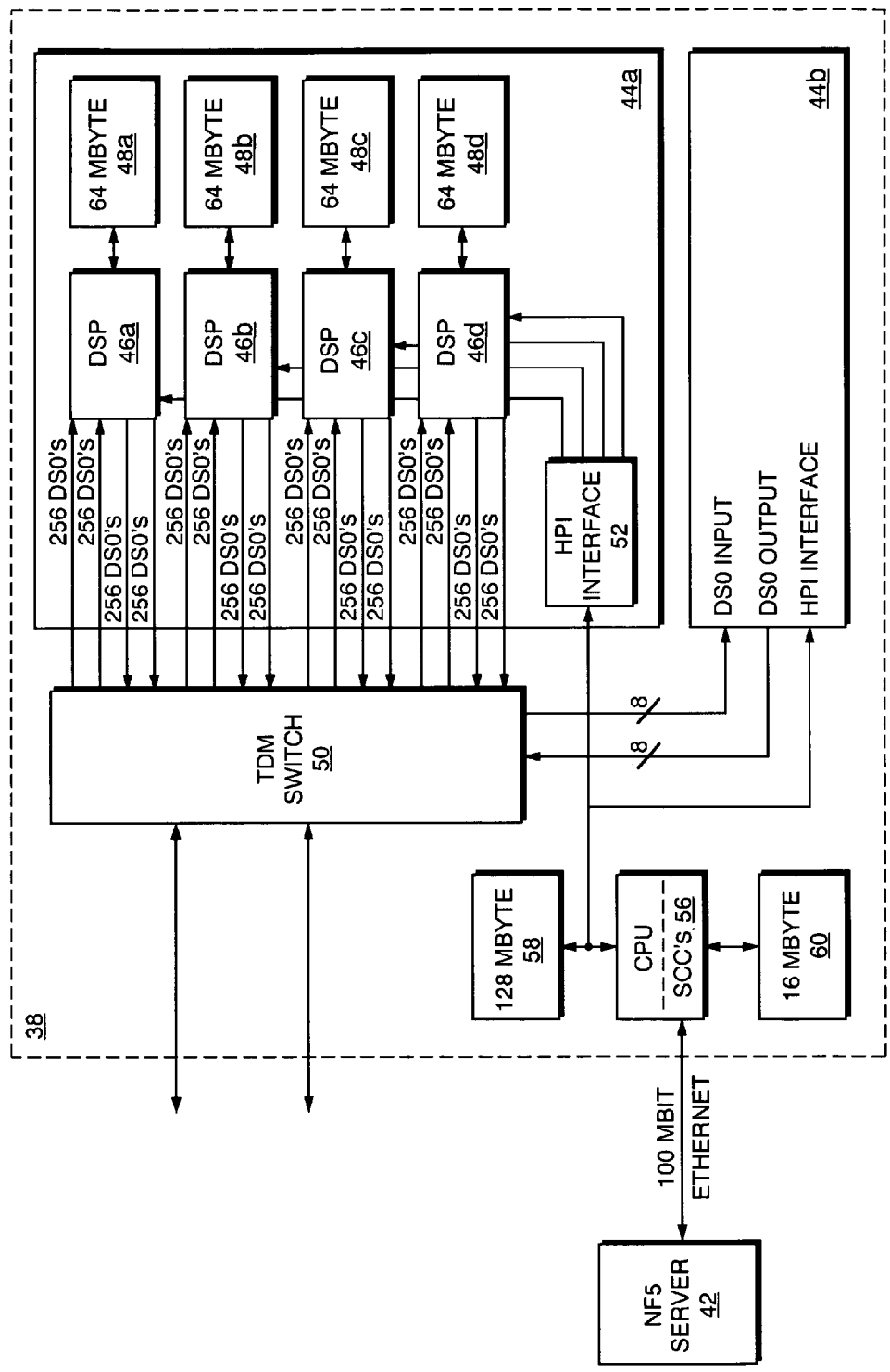
FIG. 2 is a block diagram of the media resource card shown in FIG. 1.

Referring now to FIG. 2, a detailed block diagram of the media resources card 38 is shown. A DSP module 44a includes four DSPs 46a-46d, each of which has an associated cache memory 48a-48d, respectively. Each of DSPs 46a-46d is preferably a Texas Instruments TMS320C6414, but any of a number of other commercially available DSPs could readily be adapted for use with the present invention.

DSPs 46a-46d are connected to a time division multiplex (TDM) switch 50. Each of DSPs 46a-46d is capable of receiving and transmitting up to 512 DS0s (timeslots) from TDM switch 50. If desired, a second DSP module 44b, containing an additional four DSPs (not shown) may added to media resources card.

Overall control of the operation of media resources card 38 is carried out by a CPU 56, which is preferably a Motorola PowerQUICC 8260 processor, having an associated cache memory 58 and a local memory 60. CPU 56 also has an associated Ethernet network interface through which the CPU may communicate with a Network File System (NFS) file server 42. Any of a number of other commercially available microprocessors or other file system protocols, including CIFS or TFTP, could readily be adapted for use with the present invention.

Cache memories 48a-48d and 58 are preferably used to cache voice recorded announcements or other recordings which are intended for playback to callers (not shown) as directed by an application running on host computer 4 (FIG. 1). Large quantities of such voice recorded announcements may be stored on file server 42, in accordance with NFS, CIFS or another desired file system protocol, retrieved by CPU 56 and then cached at the time of initial playback.

Figure 3:
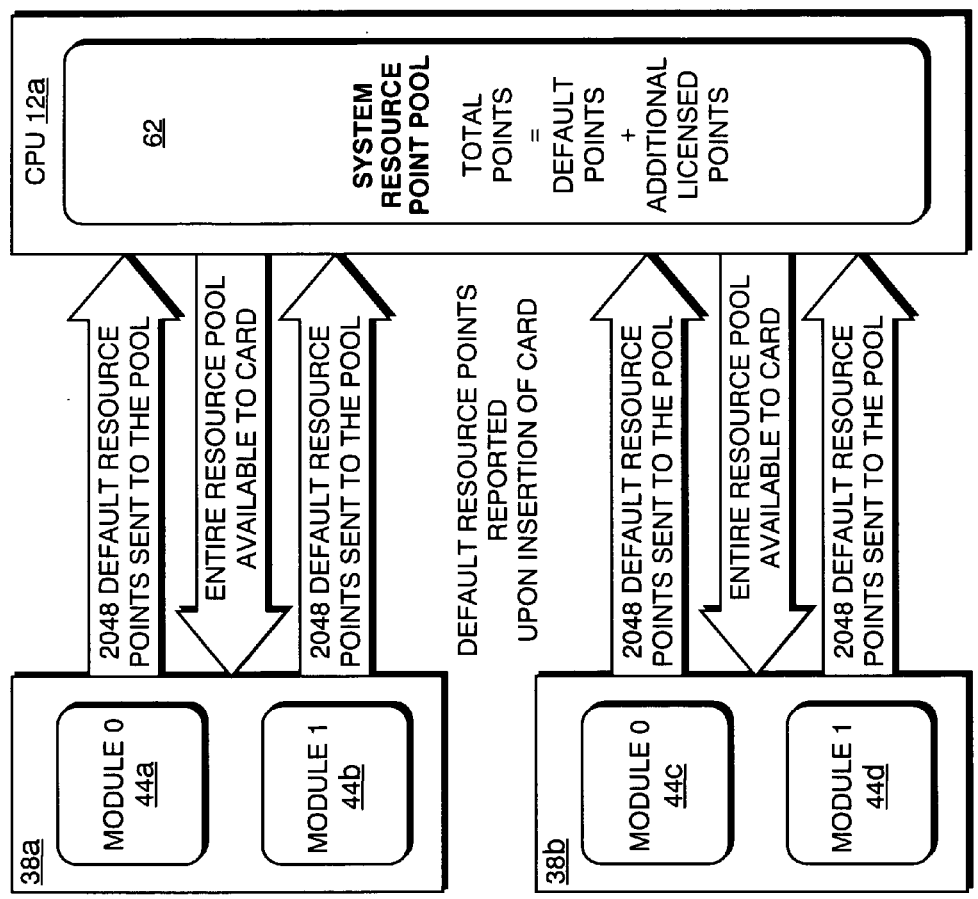
FIG. 3 is a block diagram illustrating an arrangement for centrally pooling resource points and dynamically allocating such points among one or more media resource cards of the type shown in FIGS. 1 and 2.

With reference now to FIG. 3, illustrated there is an arrangement for centrally pooling and dynamically allocating "resource points" among one or more media resource cards 38. As shown, two media resource cards 38a and 38b are present and each such card has two DSP modules 44a-44d. In a preferred embodiment, when each of cards 38a and 38b is installed in a converged services platform 2 (FIG. 1), a total of 4096 default resource points per card are added to a central system resource point pool 62 maintained on CPU card 12a. The total points present in the pool 62, which is the sum of all default resource points plus any additional points licensed, are preferably available to any given media resource card 38. In response to messages received from an application running on host computer 4 (FIG. 1), CPU card 12a will dynamically allocate resource points among cards 38a and 38b. In a converged services platform employing multiple media resource cards, redundancy is provided by automatically allocating additional resource points from the central pool to increase the performance of the remaining cards upon a media resource card failure.

In order to determine how many resource points are needed for a particular application, it is necessary to specify what services (e.g., tone detection, tone generation, playback/record, etc.) are needed in a "worst case" or peak demand scenario. Based on that specification, one may refer to the tables of FIGS. 4A and 4B to determine how many resource points are needed for each service. By multiplying the required services by the required resource points, a maximum resource point total is obtained. If the maximum resource point total is equal to or less than the total default resource points represented by media resource cards 38, then no additional resource points are needed. If the maximum resource point total is greater than the total default resource points, then the customer may license additional resource points.

What is claimed is:

1. A method of licensing and managing media resources in a telecommunications system including a converged services platform, said method comprising the steps of:
   creating a central pool storing resource points representing a license or authorization level of media resource service capability;
   providing one or more media resource cards, each card including a separate processor and at least one digital signal processor (DSP), and
   dynamically allocating resource points from said central pool to said one or more media resource cards as needed to enable the DSP's thereof, under the control of their respective separate processors, to collectively perform specific DSP services for a customer as authorized by the allocated resource points.

2. The method as in claim 1, further comprising the step of: storing in said central pool default and/or additional licensed resource points represented by a converged services platform.

3. The method as in claim 1, wherein said allocating step allocates resource points from said central pool to a particular media resource card for a specific DSP media resource service.

4. The method as in claim 1, further comprising the step of: providing redundancy in the event a media resource card becomes unavailable by allocating additional resource points from said central pool to remaining available cards.

5. The method as in claim 1, further comprising the step of: designating a specified number of resource points required to perform each media resource service available.

6. The method as in claim 5, further comprising the step of: determining a number of resource points needed to perform an application by multiplying a number of required media resource services by their corresponding number of required resource points.

7. The method as in claim 6, further comprising the step of: licensing additional resource points to a customer in the event that said resource points needed to perform an application are greater than said default resource points available.

8. The method as in claim 7, further comprising the step of: notifying said customer that a license for additional resource points is needed in that event.

9. The method as in claim 1, wherein said DSP media resource service is selected from the group consisting of tone generation, tone detection, and recording/playback of voice recorded announcements.

10. A converged services platform, comprising:
    one or more media resource cards for performing media resource services each card including at least one digital signal processor (DSP) and a separate control processor;
    a central pool storing resource points representing a license or authorization level of media resource capability, said central pool for storing default and/or additional licensed resource points represented by said converged services platform; and
    a main processor for dynamically allocating resource points from said central pool to one or more media resource cards as needed to enable the DSP's thereof, under the control of their respective separate processors, to collectively perform specific DSP services for a customer as authorized by the allocated resource points.

11. The converged services platform as in claim 10, wherein said main processor allocates prints from said central pool to a particular media resource card for a specific media resource service.

12. The converged services platform as in claim 10, wherein said main processor provides redundancy in the event a media resource card becomes unavailable by allocating additional resource points from said central pool to remaining available cards.

13. The converged services platform as in claim 10, wherein each media resource service has a specified number of resource points, which are required to perform said DSP service.

14. The converged services platform as in claim 13, wherein a number of resource points needed to perform an application is determined by multiplying a number of required media resource services by their corresponding number of required resource points.

15. The converged services platform as in claim 14, wherein said additional licensed resource points are licensed to a customer in the event that said resource points needed to perform an application are greater than said default resource points available.

16. The converged services platform as in claim 10, wherein said DSP media resource service is selected from the group consisting of tone generation, tone detection, and recording/playback of voice recorded announcements.

17. The converged services platform as in claim 10, further comprising: cache memories programmed to cache voice recorded announcements and/or other announcements for playback.

18. The converged services platform as in claim 17, wherein each card further includes an associated file server coupled with a network interface and said separate processor, said file server storing said voice recorded announcements and other announcements.

19. A method for managing available resources of a telecommunications system having one or more media resource cards, each card including at least one digital signal processor (DSP) and a separate control processor, the method comprising:

storing available resource points representing media resource service capability of the telecommunications system; and dynamically allocating available resource points to the media resource cards as needed to enable the DSP's thereof, under the control of their respective separate processors, to provide media resource services for a customer as authorized by the allocated resource points.

20. The method as in claim 19, further comprising:
preventing a media resource card from performing a media resource service in the event there are no remaining available resource points.

21. The method as in claim 19, further comprising:
storing additional resource points based on a customer need to utilize more media resources than allowed by the available resource points.

22. The method as in claim 19, further comprising:
storing a default number of available resource points based on available DSP resources on one or more media resource cards.

23. The method as in claim 22, further comprising:
in response to removal of one of the media resource cards, removing a corresponding number of default available resource points.

24. The method as in claim 19, further comprising:
assigning a number of resource points required to perform certain media resource services.

25. The method as in claim 24, further comprising:
allocating a corresponding number of resource points to the media resource cards in order to perform a certain DSP media resource service.

26. The method as in claim 19, wherein the media resource service capability is based on a license or authorization level of a customer.

* * * * *